(12) United States Patent
Broyelle et al.

(10) Patent No.: US 11,436,761 B2
(45) Date of Patent: Sep. 6, 2022

(54) PREVENTING FEATURE LOSS WHEN COMPRESSING IMAGES

(71) Applicant: International Business Machines Corporation, Armonk, NY (US)

(72) Inventors: Jean-Armand Broyelle, Beaulieu (FR); Marc Fiammante, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 16/822,574

(22) Filed: Mar. 18, 2020

(65) Prior Publication Data

US 2021/0295570 A1    Sep. 23, 2021

(51) Int. Cl.
| | | |
|---|---|---|
| *G06T 17/00* | (2006.01) | |
| *G06T 9/00* | (2006.01) | |
| *G06K 9/62* | (2022.01) | |
| *G06T 15/08* | (2011.01) | |
| *G06N 5/04* | (2006.01) | |
| *G06N 20/00* | (2019.01) | |
| *G06V 10/28* | (2022.01) | |

(52) U.S. Cl.
CPC .............. *G06T 9/002* (2013.01); *G06K 9/623* (2013.01); *G06K 9/6256* (2013.01); *G06N 5/04* (2013.01); *G06N 20/00* (2019.01); *G06T 15/08* (2013.01); *G06V 10/28* (2022.01)

(58) Field of Classification Search
None
See application file for complete search history.

(56) References Cited

U.S. PATENT DOCUMENTS

| | | | | |
|---|---|---|---|---|
| 5,317,689 | A * | 5/1994 | Nack | G06T 15/40 345/536 |
| 5,608,849 | A * | 3/1997 | King, Jr. | G06T 7/30 382/128 |
| 6,539,127 | B1 * | 3/2003 | Roche | G06T 3/4061 382/294 |
| 10,970,518 | B1 * | 4/2021 | Zhou | G06K 9/6232 |
| 2007/0040830 | A1 * | 2/2007 | Papageorgiou | G06T 15/08 345/424 |
| 2008/0212887 | A1 | 9/2008 | Gori | |

(Continued)

FOREIGN PATENT DOCUMENTS

| | | |
|---|---|---|
| CA | 2373707 A1 | 8/2002 |
| CN | 102203826 A | 9/2011 |

(Continued)

*Primary Examiner* — Anh-Tuan V Nguyen
(74) *Attorney, Agent, or Firm* — Randy E. Tejeda

(57) ABSTRACT

In an approach to image compression while retaining feature information at original coordinates, one or more computer processors compress an image while retaining pattern and feature information at original coordinates, wherein the image is a full resolution 3D image. The one or more computer processors create one or more image subsets based on the one or more determined regions of interest identified by utilizing a first pass selection of the regions of interest based on the compressed image. The one or more computer processors train one or more models based the created one or more image subsets that contain one or more regions of interest based on the compressed image.

17 Claims, 6 Drawing Sheets

(56) References Cited

U.S. PATENT DOCUMENTS

| | | | |
|---|---|---|---|
| 2015/0022521 A1* | 1/2015 | Loop | G06T 15/005 345/424 |
| 2016/0321784 A1 | 11/2016 | Annapureddy | |
| 2018/0242020 A1 | 8/2018 | Siddeq | |
| 2018/0268571 A1 | 9/2018 | Park | |
| 2019/0122427 A1* | 4/2019 | Zeng | G06T 9/40 |
| 2019/0340462 A1* | 11/2019 | Pao | G06V 10/82 |

FOREIGN PATENT DOCUMENTS

| | | |
|---|---|---|
| EP | 1791087 A1 | 5/2007 |
| WO | 2007061744 A2 | 5/2007 |

* cited by examiner

Shape 502 {
  a=2
  parallelogramsize=a*a*a
}

Formula 504 {
```
def formula_term(onevalued_pixel_index,pixel_in_flattened_volume_index):
    if onevalued_pixel_index==1:
        return 0
    numerator=1
    denominator=1
    for idx in range(1,pixel_in_flattened_volume_index+1):
        numerator=numerator*(onevalued_pixel_index-idx)
        denominator=denominator*idx
    return numerator/denominator
```
}

Index Calculations 506 {
```
def compute(flattened_volume):
list=[]
    for i in range(len(flattened_volume)):
        if flattened_volume[i]==1:
            list.append(i+1)
    combinations=0
    current_volume_number_of_pixels=len(list)
    if current_volume_number_of_pixels==0:
        combinations=0
    elif current_volume_number_of_pixels==1:
        combinations=1
    else:
        combinations=1
        for i in range(1,current_volume_number_of_pixels):
            combinations+=int(comb(8,i))

def sumall(list):
    result=0
    for i in range(len(list)):
        iresult=int(formula_term(list[i],i+1))
        result+=iresult
    return result index_for_pixel_count=sumall(list)
index_with_all_pixels=index_for_pixel_count+combinations
return index_with_all_pixels
```
}

FIG. 5

PREVENTING FEATURE LOSS WHEN COMPRESSING IMAGES

BACKGROUND

The present invention relates generally to the field of machine learning, and more particularly to image compression while retaining feature information at original coordinates.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems "learn" to perform tasks by considering examples, generally without being programmed with any task-specific rules. For example, in image recognition, NNs learn to identify images that contain cats by analyzing example images that are correctly labeled as "true"/"false" (e.g., "cat"/"not cat") and using the results to identify objects (e.g., cats) in other images. In this example, NNs classify without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Convolutional neural networks (CNN) are a class of neural networks, most commonly applied to analyzing visual imagery. CNNs are regularized versions of a multi-layer perceptron (e.g., fully connected network), where each neuron in one layer is connected to all neurons in the next layer. CNNs take advantage of the hierarchical pattern in data and assemble more complex patterns using smaller and simpler patterns. CNNs break down images into small patches (e.g., 5×5 pixel patch), then moves across the image by a designated stride length. Therefore, on the scale of connectedness and complexity, CNNs are on the lower extreme. CNNs use relatively little pre-processing compared to other image classification algorithms, allowing the network to learn the filters that in traditional algorithms were hand-engineered.

A voxel represents a value on a regular grid in three-dimensional space. As with pixels in a two-dimensional (2D) bitmap, voxels themselves do not typically have their position (coordinates) explicitly encoded with their values. Instead, rendering systems can infer the position of a voxel based upon its position relative to other voxels (i.e., its position in the data structure that makes up a single volumetric image). In contrast to pixels and voxels, polygons are often explicitly represented by the coordinates of their vertices (points). A direct consequence of this difference is that polygons can efficiently represent simple three-dimensional (3D) structures with lots of empty or homogeneously filled space, while voxels excel at representing regularly sampled spaces that are non-homogeneously filled.

SUMMARY

Embodiments of the present invention disclose a computer-implemented method, a computer program product, and a system for image compression while retaining feature information at original coordinates. The computer-implemented method includes one or more computer processors compressing an image while retaining pattern and feature information at original coordinates, wherein the image is a full resolution 3D image. The one or more computer processors create one or more image subsets based on the one or more determined regions of interest identified by utilizing a first pass selection of the regions of interest based on the compressed image. The one or more computer processors train one or more models based the created one or more image subsets that contain one or more regions of interest based on the compressed image.

BRIEF DESCRIPTION OF THE DRAWINGS

FIG. 5 illustrates an exemplary algorithm utilized by a program within the computational environment of FIG. 1, in accordance with an embodiment of the present invention.

DETAILED DESCRIPTION

Figure 1:
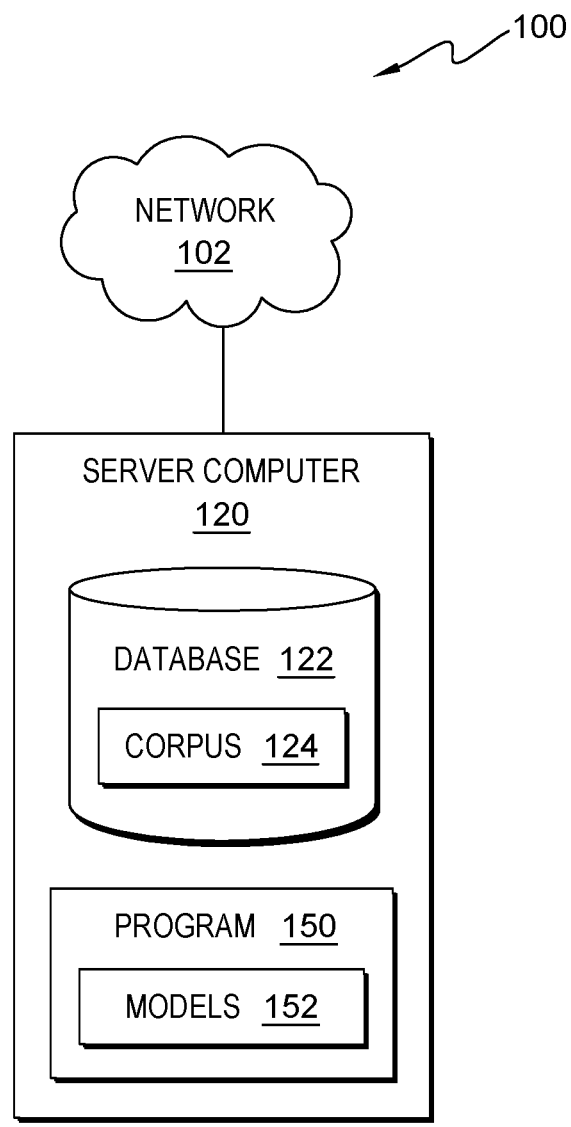
FIG. 1 is a functional block diagram illustrating a computational environment, in accordance with an embodiment of the present invention.

Traditionally, deep learning image processing and recognition models, such as neural networks and convolutional neural networks (CNNs), require large amounts of memory (i.e., system memory, graphical processing unit (GPU) memory, etc.) to handle 3D images or large 2D videos. Many application areas such as facial recognition, self-driving cars, medical imaging (e.g., magnetic resonance imaging (MM), etc.), and video applications utilize deep learning image processing. Typically, images have varying workload characteristics, but commonly are very computationally intensive especially has image size and resolution increases. The intensive computational requirements limit many organizations in selecting and determining economically efficient and accurate models. Current GPUs have limited amounts of dedicated memory, normally ranging between 1 gigabyte and 16 gigabytes. Traditionally, consumer GPUs do not have the required amount of memory to process large 3D images, especially at high resolutions or dimensions. Often large images exceed one or more physical limits of a computer or system. Furthermore, sampling and converting images to lower resolutions and smaller image formats that are capable of being processed on GPU memory cause a significant reduction in image features and information, thus detrimentally impacting the accuracy of associated models.

Embodiments of the present invention allows a compression of image while retaining essential pattern (e.g., locations and relationships of a voxel or pixel when compared with adjacent or near voxels or pixels), features, and information at original coordinates. Embodiments of the present invention allow for a first pass selection of a plurality of regions of interest. Embodiments of the present invention creates a plurality of subsets, based on selected regions of interested, utilized to train one or more tailored models with significant reductions to computational system requirements. Embodiments of the present invention allow for efficient training of neural networks utilized in image classification without the need for large data sets. Embodiments of the present invention recognize that model efficiency is improved by creating and utilizing training sets created from one or more compressed image subsets, where each image subset is created from first pass selections of regions of interest. Embodiments of the present invention recognize that system efficiency is enhanced by reducing an image size of a number of images in a training set, thus reducing the required storage, system memory, and computational requirements. Embodiments of the present invention recognize neural network computational efficiency is increased due to a reduction in information presented at an initial network layer as opposed to the traditional method of ingesting all utilized pixels. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 6.

Database 122 is a repository for data used by program 150. In the depicted embodiment, database 122 resides on server computer 120. In another embodiment, database 122 may reside on elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as original images, binarized images, reduced images, and associated sets of processed voxels. In the depicted embodiment, database 122 contains corpus 124.

Corpus 124 contains one or more examples, sets of training data, data structures, and/or variables used to fit the parameters of a specified model. The contained data comprises of pairs of input vectors (e.g., pixel vectors) with associated output vectors (e.g., classifications, labels, etc.). In an embodiment, corpus 124 may contain one or more sets of one or more instances of unclassified or classified (e.g., labelled) data, hereinafter referred to as training statements. In another embodiment, the training data contains an array of training statements organized in labelled training sets. For example, a plurality of training sets includes labels or classifications paired with associated training statements (e.g., images, image feature vectors, stub images, etc.). In an embodiment, each training set includes a label and an associated array or set of training statements which can be utilized to train one or more models. In an embodiment, corpus 124 contains unprocessed training data. In a further embodiment, corpus 124 contains vectorized (i.e., one-hot encoding, dimension reduced, etc.) training sets, associated training statements, and labels. In an embodiment, corpus 124 stores ground truth-based (i.e., real data) image sets.

Models 152 utilize transferrable neural networks algorithms and models (e.g., recurrent neural network (RNN), long short-term memory (LSTM), deep stacking network (DSN), deep belief network (DBN), convolutional neural networks (CNN), compound hierarchical deep models, etc.) that can be trained with supervised and/or unsupervised methods. In an embodiment, models 152 utilize deep learning techniques to classify images or to classify one or more objects contained in one or more images based on a plurality of features. In another embodiment, models 152 assesses an image by considering different features, available as structured or unstructured data, and applying relative numerical weights. In various embodiments, program 150 feeds a vectorized training set of feature data to models 152. In various embodiments, the data (images) is labeled with an associated classification enabling models 152 to learn what features are correlated to a specific image, prior to use. In some embodiments, models 152 learn from training sets to distinguish between likely and unlikely classifications based on an image. In another embodiments, models 152 contains one or more models trained to scan and select one or more regions of interest contained in one or more images. In this embodiment, program 150 trains one or more models to identify regions of interest based on one or more compressed (i.e., reduced, indexed, etc.) patterns and images, allowing rapid and efficient identification of regions of interest.

Program 150 is a program for image compression while retaining feature information at original coordinates. In various embodiments, program 150 may implement the following steps: compress an image while retaining pattern and feature information at original coordinates, wherein the image is a full resolution 3D image; create one or more image subsets based on the one or more determined regions of interest identified by utilizing a first pass selection of the regions of interest based on the compressed image; train one or more models based the created one or more image subsets that contain one or more regions of interest based on the compressed image. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
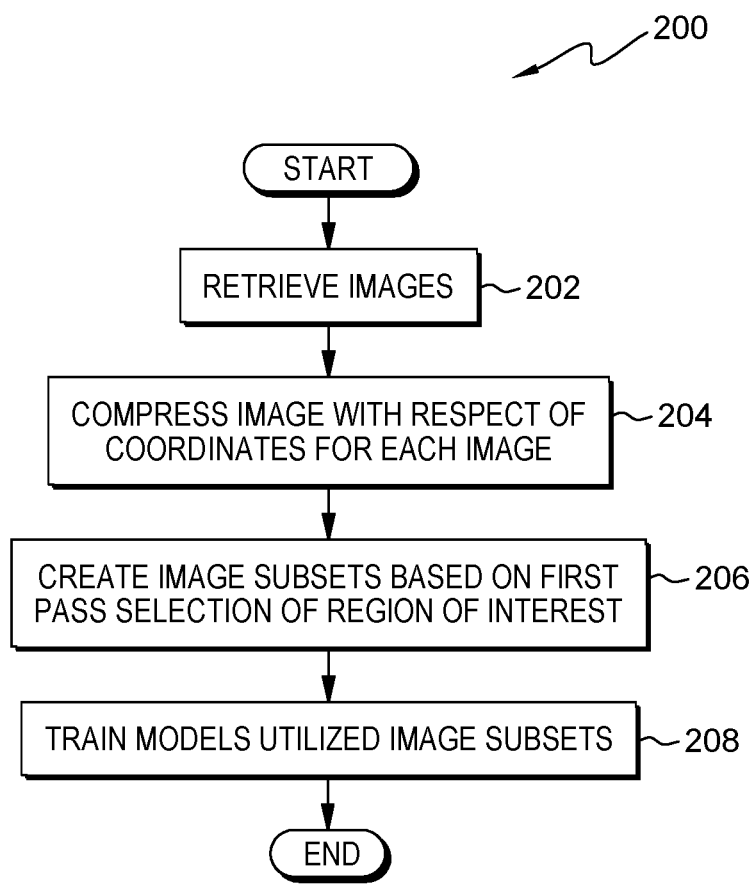
FIG. 2 is a flowchart depicting operational steps of a program, on a server computer within the computational environment of FIG. 1, for training models utilizing created image subsets based on compressed images, in accordance with an embodiment of the present invention.

FIG. 2 is a flowchart depicting operational steps of program 150 for training models utilizing the created image subsets based on compressed images, in accordance with an embodiment of the present invention.

Program 150 retrieves images (step 202). In an embodiment, program 150 initiates when promoted by a user. In another embodiment, program 150 initiates when detecting or receiving one or more images or sets of images. In various embodiments, program 150 retrieves one or more images or sets of images from database 122 and corpus 124. In another embodiment, program 150 retrieves images from a plurality of sources, such as a publicly available external source, and stores said information within corpus 124. For example, program 150 retrieves a set of high-resolution (e.g., greater than 2160p, etc.) 2D or 3D images from an online image repository. In another embodiment, program 150 retrieves a set of voxels contained in one or more images.

Program 150 compresses an image with respect of coordinates for each image (step 204). Program 150 compresses (i.e., reduces) an image while keeping essential pattern and features information at original coordinates. In an embodiment, program 150 applies a contrast threshold to one or more retrieved images, as described in step 302, resulting in a binary representation of the image. In an embodiment, program 150 identifies one or more binary patterns contained in the binary representation of the image, as described in step 304. In an embodiment, program 150 calculates a unique index for each identified pattern, as described in step 306. In an embodiment, program 150 replaces a voxel with a corresponding calculated index, as described in step 308. The compression procedure (step 204) is further described and detailed in the flowchart and steps contained within FIG. 3.

Program 150 creates image subsets based on first pass selection of regions of interest (step 206). In an embodiment, program 150 identifies one or more regions of interest (ROI) (e.g., contours or surfaces outlining an object, etc.) contained in a reduced image, restricting a subsequent model to a selected region. In an embodiment, program 150 creates one or more image subsets by duplicating identified ROIs and applying filters to created subsets and contained ROIs. In another embodiment, program 150 identifies one or more regions of interest utilizing the one or more identified patterns as described in step 306. In this embodiment, program 150 compresses images, as described in step 204, to efficiently identify regions of interest without utilizing the original full resolution 3D or 2D image (e.g., requiring multiple passes or lossy compression) but a rather utilizing a compressed image allowing rapid first pass (e.g., one iteration) identification of one or more regions of interest. In a further embodiment, program 150 computationally reduces a plurality of system requirements. In various embodiments, program 150 creates one or more image subsets based on one or more identified regions of interest. In a further embodiment, program 150 duplicates one or more subsets and applies a plurality of filters such as sharpening and edge detection. In various embodiments, program 150 trains and utilizes a trained CNN (e.g., models 152) to identify and select one or more ROIs. Responsive to the identification of one or more ROIs, program 150 creates one or more image subsets only containing ROIs and associated information.

According, in this step, program 150 outputs one or more image subsets based on one or more selected zones of interest utilizing one or more reduced (i.e., compressed) images, as detailed in step 206 and utilized to train one or models in step 208.

Program 150 trains models utilizing created image subsets (step 208). In an embodiment, program 150 trains a classification (e.g., CNN) model (e.g., models 152) by identifying the correct weights for the model by multiple forward and backward iterations, while minimizing binary cross entropy (e.g., misclassification cost) utilizing the created image subsets, thus significantly reducing the amount of required training image size. Program 150 initializes the model with one or more weights and associated hyperparameters. In an embodiment, program 150 initializes the model with randomly generated weights. In various embodiments, program 150 utilizes historical weights contained in previously iterated/trained models. In this embodiment, certain features are weighed higher than others allowing the model to learn at a quicker rate with fewer computational resources. In an embodiment, program 150 utilizes a supervised training method to train one or more models (e.g., models 152). As would be recognized by one skilled in the art, supervised training determines the difference between a prediction and a target (i.e., the error), and back-propagates the difference through the layers such that said model "learns".

In various embodiments, responsive to program 150 training a model, program 150 deploys the trained model to a plurality of production environments or respective production, test, or auxiliary environments. In another embodiment, program 150 determines which deployment environment to deploy a model out of a plurality of deployment environments (e.g., test, production, backup server, containers, or virtual machines). In an embodiment, the user instructs program 150 to deploy a specific model to a specific environment. In another embodiment, program 150 utilizes the deployed model to classify one or more images. In an embodiment, program 150, then, automatically processes the next image, responsive to a successful image classification.

According, in this step, program 150 creates and trains a model based on one or more created subsets of a full resolution image. The one or more created subsets allow computationally restricted systems and models the ability to ingest full resolution (i.e., uncompressed) images without significant performance reduction and information loss.

Figure 3:
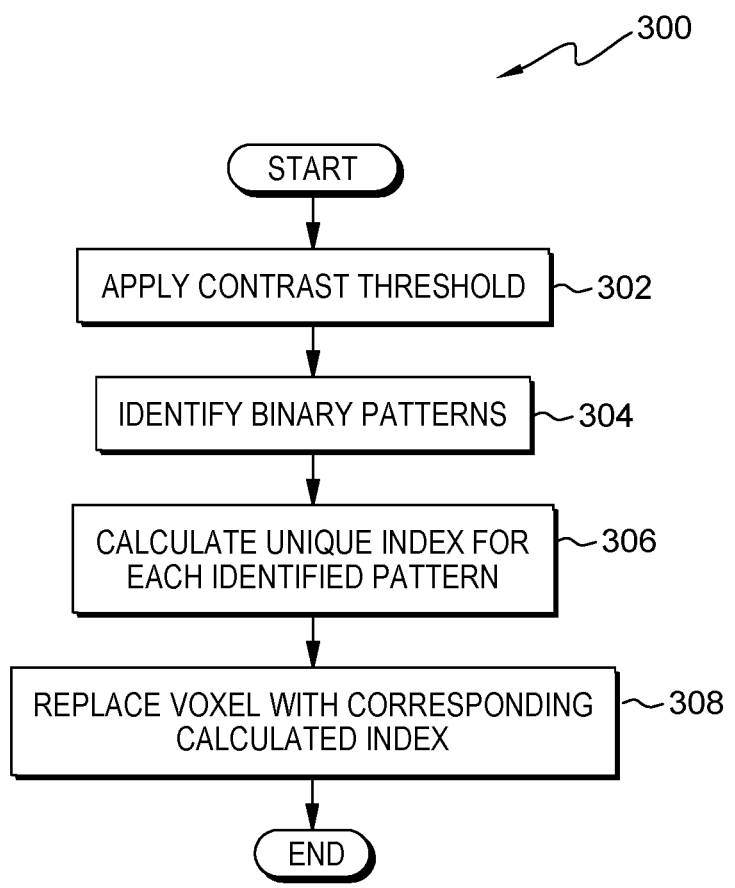
FIG. 3 is a flowchart depicting operational steps of a program, on a server computer within the computational environment of FIG. 1, for image compression while retaining feature information at original coordinates, in accordance with an embodiment of the present invention.

FIG. 3 is a flowchart depicting operational steps of program 150 for image compression while retaining feature information at original coordinates, in accordance with an embodiment of the present invention.

Figure 4:
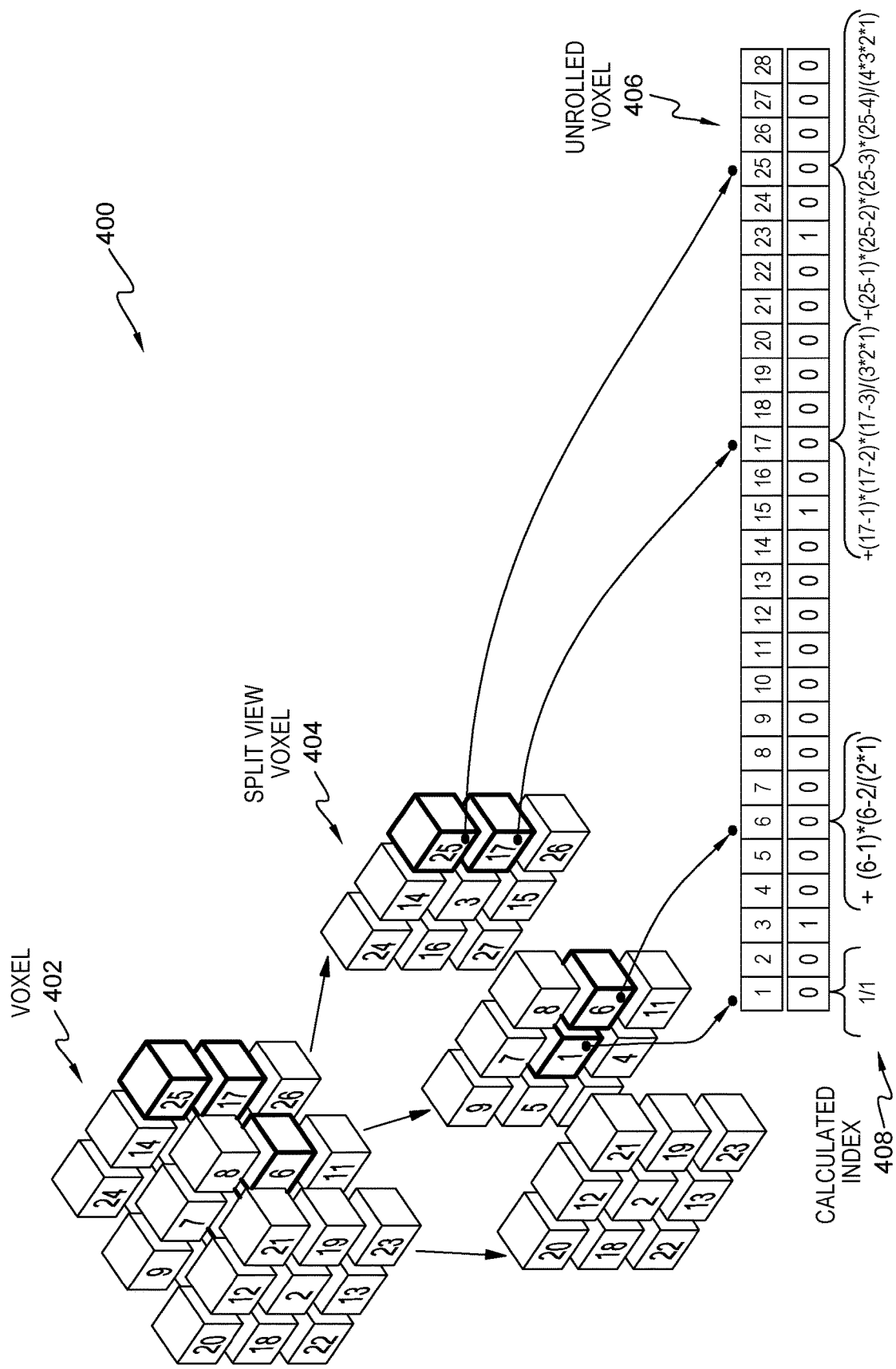
FIG. 4 depicts an example compression, in accordance with an embodiment of the present invention.

Program 150 applies a contrast threshold (step 302). Program 150 generates a binary value for each pixel contained in a retrieved image by applying a contrast threshold (e.g., binarization) to each pixel, resulting in 2 possible values (e.g., 0 or 1, 0 or 255, −1 or 1, etc.), as depicted in FIG. 4. In this embodiment, program 150 creates or groups a plurality of generated binary values and associated pixels. In an embodiment, program 150 initiates binary value generation responsive to an image normalization. In an embodiment, program 150 decomposes a 3D image into component voxels. In an embodiment, program 150 decomposes (i.e., segments) a 3D image into a plurality of space-filling polyhedrons (e.g., triangular prism, cube, hexagonal prism, rhombic dodecahedron, elongated dodecahedron, truncated octahedron, hexagonal prism, cube, truncated octahedron, and gyrobifastigium). In this embodiment, space-filling polyhedrons fill all of 3D space via translations, rotations and/or reflections. In another embodiment, space-filling pattern comprises any periodic tiling (e.g., tessellation) or honeycomb of 3D space. In another embodiment, program 150 unrolls voxels into component pixels. In this embodiment, program 150 unrolls (e.g., sorts) pixels where pixels that are closer (e.g., greater proximity) to the center of the voxel are listed sooner or higher (e.g., appearing sooner on the list or set of unrolled pixels) so that the resulting order and calculations indicate a relative distance to the center. For example, a pixel listed sooner on the list indicates a closer proximity to the voxel center providing a unified schema. In the embodiment depicted in FIG. 4, program 150 applies the contrast threshold (e.g., image thresholding) utilizing 0 or 1 for each pixel. In another embodiment, program 150 may segment an image into one or more constituent objects and apply binarization specifically to each constituent object. In an embodiment, program 150 utilizes a deterministic binarization function that transforms a pixel value to either a 0 or 1. In various embodiments, program 150 utilizes a binarization function to constrain both neural network weights and activations, as a pixel is processed (e.g., forward propagation). In the above embodiments, program 150 creates a binary image representation of one or more images comprising a binary value for each pixel (e.g., 0 or 1).

Program 150 identify binary patterns (step 304). Program 150 identifies one or more binary patterns contained in the binarized image, where given a set of pixels, voxel surface, or volume (e.g., a list of pixels, cube, etc.), program 150 computes and identifies one or more possible binary patterns. In an embodiment, the number of possible pixels, voxels, or binary combinations comprises a finite set of possibilities. For example, a 2 by 2 by 2 volume (e.g., 3D volume) has 256 distinct binary patterns or combinations. In various embodiments, a pattern comprises any combination of similar pixel values, for example a section of an image may contain a series of adjacent pixels each represented as a 1. In another embodiment, program 150 utilizes cross correlation to find other similar patterns (e.g., repeating patterns) that have a high correlation. In various embodiments, program 150 utilizes a kernel, convolution matrix or mask to identify one or more patterns. In another embodiment, program 150 constructs a binary tree representing a relationship between each pixel. In various embodiment, program 150 utilizes a plurality of clustering and classification models to identify one or more contained patterns, for example program 150 utilizes K-means clustering, Gaussian mixture models, and Hidden Markov models to identify patterns. Responsive to identifying one or more patterns, program 150 creates a set contained associated voxels and corresponding values. In an embodiment, program 150, automatically, decomposes one or more voxels into component pixels.

Program 150 calculates a unique index for each identified pattern (step 306). Responsive to program 150 identifying one or more patterns, program 150 calculates a unique (i.e., unique to each pattern) index value for each identified pattern or set of patterns. In an embodiment, program 150 sorts a set of identified patterns by number of pixels included in each pattern. For example, program 150 creates a list of identified pixels based on number of contained pixels in a pattern, where the list descends from largest number of pixels to lowest number of pixels. In another embodiment, program 150 sorts after an index has been calculated. In an embodiment, program 150 utilizes the equation 1, as follows, as an indexing function for a pattern of j pixels:

$$\text{index} = (p_j - 1) * (p_j - 2) * \ldots * \frac{p_j - j}{1 * 2 * \ldots * j} + \ldots + (p_2 - 1) * \frac{p_2 - 2}{2} + p_1 - 1 + \sum_{i=1}^{j-1}(n!/((n-i)! * i!)) \quad (1)$$

In an embodiment, program 150 utilizes equation 2, as follows, as an indexing function for a combination of pixels:

$$\text{index} = (p_j - 1)*(p_j - 2)* \ldots *(p_j - j)/(1*2* \ldots *j) + \ldots + (p_2 - 1)*(p_2 - 2)/2 + p_1 - 1 \quad (2)$$

With respect to equations (1) and (2), n denotes a size of a voxel, j denotes the total number of pixels, where $p_i$ is the offset of a pixel i in a 1D flattened vector of the voxel ($p_1$, $p_2$, ..., $p_i$, ..., $p_j$) where the value for each $p_i$ only take two values (e.g. 0 or 1, 0 or 255, −1 or 1).

In various embodiments, program 150 computes an index uniquely identifying a unique pattern of voxels and pixels. In a further embodiment, program 150 utilizes the sorted list and calculated indexes to ensure that program 150 identifies uniquely a given pattern, with a formula that ensures that all numbers are sorted by pixel density, for example patterns of binary values (i.e., density of zeros versus ones). In another embodiment, each calculated index is reversible such that program 150 can reverse the calculation to determine the original format or structure of the compressed image.

According, in this step, program 150 calculates and applies a value that is reversible to the original pattern, that is proportional to pixel or voxel density, and that is indicative of essential features contained in an image.

Program 150 replaces a voxel with corresponding calculated index (step 308). Responsive to program 150 calculating a unique index for a voxel or set of pixels contained in an identified pattern, program 150 creates a new image representation only containing calculated indexes for each identified pattern. In an embodiment, program 150 replaces a voxel with a corresponding calculated index. In an embodiment, program 150 creates a plurality of sets comprising only calculated index values for each identified pattern. In another embodiment, program 150 creates a set containing a plurality of decomposed identified objects as sets of constituent patterns. In this embodiment, program 150 compresses a voxel to a factor of n:1 or 27 assuming a voxel has a pixel density of n=a*a*a (e.g., n=3*3*3).

Accordingly, in this step, program 150 utilizes a calculated index that is sorted automatically by pixel density (i.e., pixel quantity), for example low pixel densities result in low calculated indexes, such that the resulting index is a feature corresponding to the same relative coordinates on compacted image as compared to the original image. Further, utilizing the techniques and calculations described above, program 150 reduces an image size, for example program 150 reduces a 3D image size by a factor of 27.

FIG. 4 depicts example compression 400, in accordance with an illustrative embodiment of the present invention. Example compression 400 contains voxel 402 representing a cuboid set of voxels, split view voxels 404 representing the cuboid set of voxels into three voxel planes, unrolled voxels 406 representing voxels unrolled into component pixels, and calculated index 408 representing a unique index calculated for binary patterns contained in the voxels. In an embodiment, program 150 calculates an index for multiple pixel combination such as the combination of 1 bit to combination of 3 bits, such as 27!/((27−1)!*1!)+27!/((27−2)!*2!)+27!/((27−3)!*3!).

FIG. 5 depicts algorithm 500, in accordance with an illustrative embodiment of the present invention. Example code 500 contains shape 502 which is a 2 by 2 by 2 space-filling shape comprising of voxels, formula 504 which is a formula to calculate a unique index for a pattern or combination of pixels in a given volume or surface, index calculations 506 that compute an absolute index representing the total possible pixel combinations with a smaller number of '1'.

Figure 6:
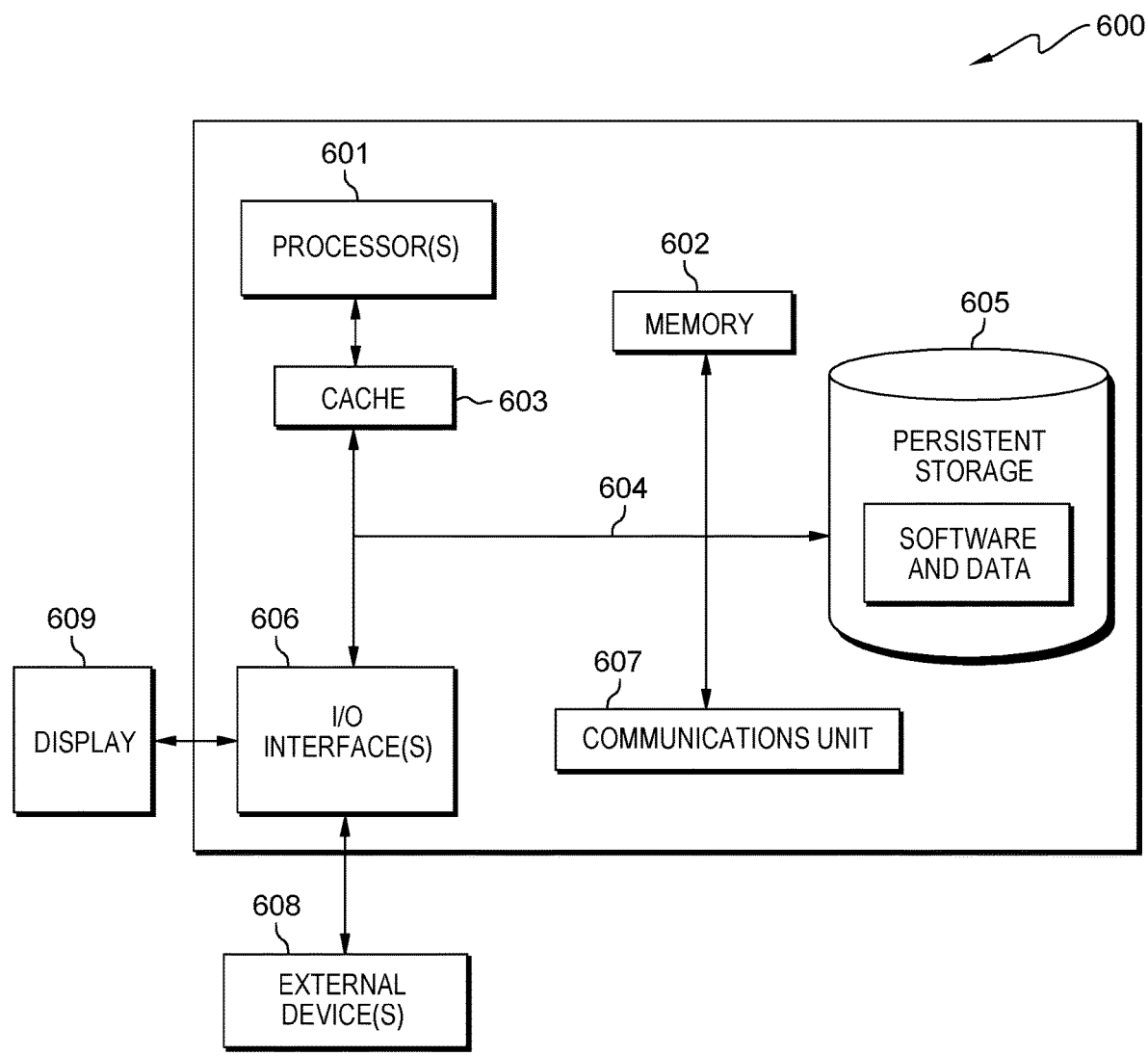
FIG. 6 is a block diagram of components of the server computer, in accordance with an embodiment of the present invention.

FIG. 6 depicts a block diagram of components of server computer 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server computer 120 each include communications fabric 604, which provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications, and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of computer processor(s) 601 by holding recently accessed data, and data near accessed data, from memory 602.

Program 150 may be stored in persistent storage 605 and in memory 602 for execution by one or more of the respective computer processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards. Communications unit 607 may provide communications through the use of either or both physical and wireless communications links. Program 150 may be downloaded to persistent storage 605 through communications unit 607.

I/O interface(s) 606 allows for input and output of data with other devices that may be connected to server computer 120. For example, I/O interface(s) 606 may provide a connection to external device(s) 608, such as a keyboard, a keypad, a touch screen, and/or some other suitable input device. External devices 608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 605 via I/O interface(s) 606. I/O interface(s) 606 also connect to a display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    compressing, by one or more computer processors, an image while retaining pattern and feature information at original coordinates, wherein the image is a full resolution 3D image, comprising:
        decomposing, by one or more computer processors, the image into one or more space-filling shapes, wherein each shape of the one or more space-filling shapes comprises a plurality of voxels;
        unrolling, by one or more computer processors, each voxel in the plurality of voxels contained in each segmented space-filling shape into a flatten list containing pixels, wherein pixels appearing sooner in the flatten list are closer to a center of a respective voxel;
    creating, by one or more computer processors, one or more image subsets based on one or more determined regions of interest identified by utilizing a first pass selection of the regions of interest based on the compressed image; and
    training, by one or more computer processors, one or more models based the created one or more image subsets that contain one or more regions of interest based on the compressed image.

2. The method of claim 1, further comprising:
    generating, by one or more computer processors, a group of binary values comprising at least a binary value for a respective pixel by applying a contrast threshold to the respective pixel for each unrolled voxel in the plurality of voxels;
    identifying, by one or more computer processors, one or binary patterns for the generated group of binary values;
    reversibly calculating, by one or more computer processors, an index for each identified binary pattern that identifies a unique pattern of voxels and component pixels; and
    generating, by one or more computer processors, the compressed image only containing calculated indexes for each identified pattern.

3. The method of claim 2, wherein generating the compressed image only containing calculated indexes for each identified pattern, comprises:
    replacing, by one or more computer processors, an identified pattern with a corresponding calculated index.

4. The method of claim 2, wherein identifying one or binary patterns for the generated group of binary values utilizes cross correlation to identify one or more binary patterns that have a high pattern correlation.

5. The method of claim 1, wherein the one or more models are convolutional neural networks.

6. The method of claim 5, further comprising:
    deploying, by one or more computer processors, the one or more convolutional neural networks.

7. The method of claim 1, wherein the space-filling shapes are polyhedrons.

8. A computer program product comprising:
    one or more computer readable storage media and program instructions stored on the one or more computer readable storage media, the stored program instructions comprising:
    program instructions to compress an image while retaining pattern and feature information at original coordinates, wherein the image is a full resolution 3D image, comprising:
        program instructions to decompose the image into one or more space-filling shapes, wherein each shape of the one or more space-filling shapes comprises a plurality of voxels;
        program instructions to unroll each voxel in the plurality of voxels contained in each segmented space-filling shape into a flatten list containing pixels, wherein pixels appearing sooner in the flatten list are closer to a center of a respective voxel;
    program instructions to create one or more image subsets based on the one or more determined regions of interest identified by utilizing a first pass selection of the regions of interest based on the compressed image; and
    program instructions to train one or more models based the created one or more image subsets that contain one or more regions of interest based on the compressed image.

9. The computer program product of claim 8, wherein the program instructions, stored on the one or more computer readable storage media, further comprise:
- program instructions to generate a group of binary values comprising at least a binary value for a respective pixel by applying a contrast threshold to the respective pixel for each unrolled voxel in the plurality of voxels;
- program instructions to identify one or binary patterns for the generated group of binary values;
- program instructions to reversibly calculate an index for each identified binary pattern that identifies a unique pattern of voxels and component pixels; and
- program instructions to generate the compressed image only containing calculated indexes for each identified pattern.

10. The computer program product of claim 9, wherein the program instructions to generate the compressed image only containing calculated indexes for each identified pattern, comprise:
- program instructions to replace an identified pattern with a corresponding calculated index.

11. The computer program product of claim 9, wherein identifying one or binary patterns for the generated group of binary values utilizes cross correlation to identify one or more binary patterns that have a high pattern correlation.

12. The computer program product of claim 8, wherein the one or more models are convolutional neural networks.

13. A computer system comprising:
- one or more computer processors;
- one or more computer readable storage media; and
- program instructions stored on the computer readable storage media for execution by at least one of the one or more processors, the stored program instructions comprising:
  - program instructions to compress an image while retaining pattern and feature information at original coordinates, wherein the image is a full resolution 3D image, comprising:
    - program instructions to decompose the image into one or more space-filling shapes, wherein each shape of the one or more space-filling shapes comprises a plurality of voxels;
    - program instructions to unroll each voxel in the plurality of voxels contained in each segmented space-filling shape into a flatten list containing pixels, wherein pixels appearing sooner in the flatten list are closer to a center of a respective voxel;
  - program instructions to create one or more image subsets based on the one or more determined regions of interest identified by utilizing a first pass selection of the regions of interest based on the compressed image; and
  - program instructions to train one or more models based the created one or more image subsets that contain one or more regions of interest based on the compressed image.

14. The computer program product of claim 13, wherein the program instructions, stored on the one or more computer readable storage media, further comprise:
- program instructions to generate a group of binary values comprising at least a binary value for a respective pixel by applying a contrast threshold to the respective pixel for each unrolled voxel in the plurality of voxels;
- program instructions to identify one or binary patterns for the generated group of binary values;
- program instructions to reversibly calculate an index for each identified binary pattern that identifies a unique pattern of voxels and component pixels; and
- program instructions to generate the compressed image only containing calculated indexes for each identified pattern.

15. The computer system of claim 14, wherein the program instructions to generate the compressed image only containing calculated indexes for each identified pattern, comprise:
- program instructions to replace an identified pattern with a corresponding calculated index.

16. The computer system of claim 14, wherein identifying one or binary patterns for the generated group of binary values utilizes cross correlation to identify one or more binary patterns that have a high pattern correlation.

17. The computer system of claim 13, wherein the one or more models are convolutional neural networks.

* * * * *